United States Patent
O'Neill et al.

(10) Patent No.: US 8,316,284 B2
(45) Date of Patent: Nov. 20, 2012

(54) COLLECTING FAILURE INFORMATION ON ERROR CORRECTION CODE (ECC) PROTECTED DATA

(75) Inventors: Arthur J. O'Neill, Wappingers Falls, NY (US); Patrick J. Meaney, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 969 days.

(21) Appl. No.: 12/360,402

(22) Filed: Jan. 27, 2009

(65) Prior Publication Data

US 2009/0164874 A1 Jun. 25, 2009

Related U.S. Application Data (62) Division of application No. 11/054,575, filed on Feb. 9, 2005, now Pat. No. 7,502,986.

(51) Int. Cl.
*H03M 13/00* (2006.01)
*G11C 29/00* (2006.01)

(52) U.S. Cl. ............ 714/785; 714/769

(58) Field of Classification Search ............ 714/769, 714/785
See application file for complete search history.

(56) References Cited

U.S. PATENT DOCUMENTS

| | | | |
|---|---|---|---|
| 3,411,135 A * | 11/1968 | Watts | 714/785 |
| 3,648,238 A * | 3/1972 | Yarrington | 714/762 |
| 3,685,014 A * | 8/1972 | Hsiao et al. | 714/753 |
| 4,364,081 A * | 12/1982 | Hashimoto et al. | 348/617 |
| 4,456,993 A * | 6/1984 | Taniguchi et al. | 714/6.1 |
| 4,509,172 A * | 4/1985 | Chen | 714/759 |
| 4,592,054 A * | 5/1986 | Namekawa et al. | 714/761 |
| 5,537,429 A * | 7/1996 | Inoue | 714/755 |
| 6,031,875 A * | 2/2000 | Im | 375/262 |
| 6,754,871 B1 * | 6/2004 | Pines et al. | 714/762 |
| 7,231,579 B1 * | 6/2007 | Pines et al. | 714/762 |
| 7,421,642 B2 * | 9/2008 | Williamson et al. | 714/785 |
| 2006/0179394 A1 * | 8/2006 | O'Neill et al. | 714/758 |

* cited by examiner

*Primary Examiner* — Joseph D Torres
(74) *Attorney, Agent, or Firm* — Cantor Colburn LLP; John Campbell

(57) ABSTRACT

Methods of error correction code (ECC) debugging may comprise detecting whether a bit error has occurred; determining which bit or bits were in error; and using the bit error information for debug. The method may further comprise comparing ECC syndromes against one or more ECC syndrome patterns. The method may allow for accumulating bit error information, comparing error bit failures against a pattern, trapping data, counting errors, determining pick/drop information, or stopping the machine for debug.

6 Claims, 13 Drawing Sheets

COLLECTING FAILURE INFORMATION ON ERROR CORRECTION CODE (ECC) PROTECTED DATA

CROSS REFERENCE TO RELATED APPLICATIONS

This is a divisional application of application Ser. No. 11/054,575, filed Feb. 9, 2005.

BACKGROUND

As components of symmetrical computer systems (SMP) become denser, there are increasingly more ways that these computer systems can experience faults or errors such as soft errors in arrays or broken wires in data busses. Error Correction Codes (ECC) are often placed into designs to protect against these unexpected failures. ECC can also be useful in detecting errors caused by design deficiencies or process variations such as noise or weak array cells. The ECC logic can serve the dual purpose of correcting these errors as well as being used to debug these various issues by trapping information pertinent to the fail in set aside "trap registers" in the hardware. Because trapping logic can occupy space on the chip, tradeoffs need to be made between debug and mainline functionality.

Currently when an error is detected in the data and ECC, trap registers trap the failing data pattern and ECC pattern as well as the syndrome that was used to correct that data and ECC pattern. Error Correction Codes (ECC) rely on a multiplicity of parity groups over the same data. By grouping the various data bits in different parity group combinations, it is possible to isolate failures to only the bit or bits that failed. A representation of these groupings is typically called an h-matrix. Each parity group is eventually checked for errors. The vector of the error results is known as the syndrome. The syndrome can be used to indicate the conditions of no errors, unique correctable errors, or uncorrectable errors.

These registers can be set to only capture data when a correctable error (CE) is detected, only when and uncorrectable error (UE) is detected, or when any error is detected (default). Error correction is a logic design scheme which is capable of detecting and correcting a certain class of error. This type of error is referred to as a correctable error (CE). Error correction can also detect another class of error which is not correctable. This type of error is referred to as an uncorrectable error (UE).

These registers can also be set to capture the first occurrence of either a UE, CE or both types of error, or they can be set to always capture the latest error (default). Currently the hardware also traps a counter of the total number of times either a CE, a UE or both types (default) of error was detected in the ECC.

This functionality can be very helpful in debugging the problems and defects in the hardware that were causing the problems in the first place, but it has limitations. For example the trapping only traps the first or last error and it only counts the total number of errors that have occurred on the checked data bus. There are some instances where you may need more information about the failure that cannot be easily gleaned from the available data. For example, you may need to trap information on all of the correctable errors that have occurred on the protected data, trapping a data pattern associated with a specific fail, or stopping a system on a specific fail for further debug. A limitation with the counting register is that you can only count the total number of errors. There is no way to control which error is being counted or to count by excluding a specific error from the count. All of this information could be useful in debugging the mechanism that is causing the fail.

SUMMARY

The shortcomings of the prior art may be overcome and additional advantages may be provided by various embodiments which may for example, provide a new method and apparatus for trapping fail data in trap registers as well as the addition of new trap registers and counters. This allows the user to change the trapping conditions of the registers to tailor their debugging to a specific experiment.

Additionally, embodiments may comprise methods and means for error correction code (ECC) debugging for a system comprising detecting whether a bit error has occurred, determining which bit or bits were in error; and using the determined bit error information for debugging. The method may further comprise comparing ECC syndromes against one or more ECC syndrome patterns. The method may allow for accumulating bit error information, comparing error bit failures against a pattern, trapping data, counting errors, determining pick/drop information, or stopping the machine for debug.

Other embodiments and aspects of the invention are described in detail herein and are considered a part of the claimed invention. For a better understanding of the invention with advantages and features, also refer to the description and to the drawings.

BRIEF DESCRIPTION OF THE SEVERAL VIEWS OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
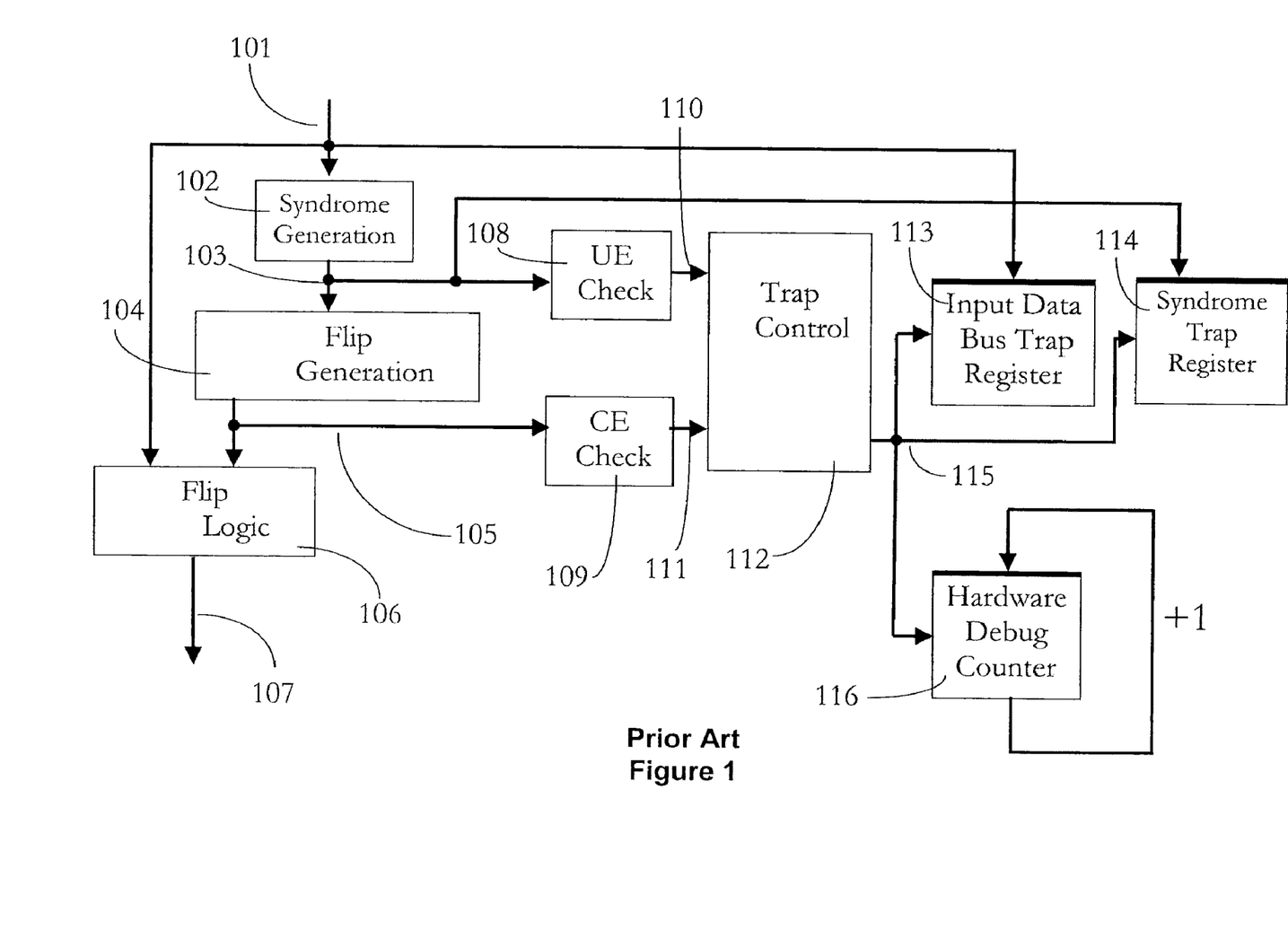
FIG. 1 illustrates a PRIOR ART example of ECC protected data in a system being corrected and information such as the input data pattern and syndrome being captured in trapping registers as well as the updating of a counter which counts all of the errors that have occurred on that protected data bus.

Turning to the prior art depicted in FIG. 1, notice there is an input data bus with corresponding Error Correction Code (ECC) checkbits, 101, as determined by an h-matrix. The input data bus, 101, then goes through syndrome generation logic, 102, which generates a syndrome 103 from the data bus based on the corresponding h-matrix. Typically, each bit is generated with an XOR tree. The syndrome, 103, is connected to flip generation logic 104 to decode which bits where flipped and to provide flip bus 105. The flip bus, 105, is XORed with the input data bus, 101, using flip logic 106, to create corrected output data bus with ECC checkbits 107. The syndrome 103, also feeds UE check logic 108, to determine if the input data bus, 101, had an Uncorrectable Error (UE). This UE status is indicated on UE status signal, 110. All bits of the flip bus 105, feed CE detection logic, 109, to determine if the input data bus, 101, had a Correctable Error (CE). This CE status is indicated on CE status signal, 111. The UE status signal, 110, and CE status signal, 111, feed trap control logic, 112, which determines whether to update trap information and indicates this update by activating trap update signal, 115. Input data trap register, 113, traps the value of the input data bus with ECC, 101, when the trap update signal, 115, is active. Likewise, syndrome trap register, 114, traps the syndrome, 103, when the trap update signal, 115, is active. The update trap signal, 115, is also used to increment the hardware debug counter, 116, which keeps a count of the number of fails that have occurred and have been trapped in the system based on the trap control logic, 112.

Figure 2:
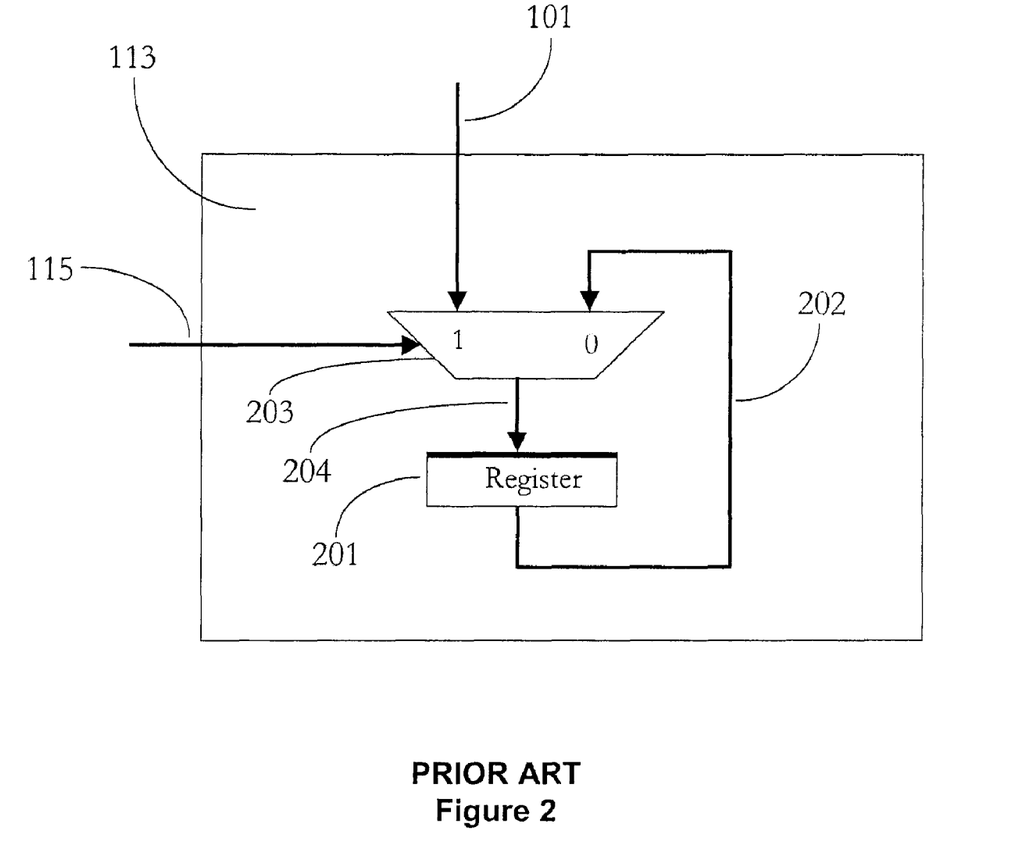
FIG. 2 illustrates a PRIOR ART example of detail on how the input data pattern is captured in a trapping register.

Turning to the prior art depicted in FIG. 2, notice there is the input data trap register, 113, which is fed by the input data bus with ECC, 101, and trap update signal, 115. The input data trap register, 113, contains a register, 201. The current register state output bus, 202, of the register, 201, as well as the input data bus, 101, feed a multiplexer, 203. The multiplexer, 203, selects, based on the state of the trap update signal, 115, which of these two buses will be sent out on the multiplexer output bus, 204. The multiplexer output bus, 204, feeds the register, 201. This creates both a hold path and an update path to the register, 201. When the trap update signal, 115, is zero, the current register state output bus, 202, feeds back to the input of the register, 201, creating the hold path. When the trap update signal, 115, is one, the current state of the input bus, 101, is fed into the register, 201, creating the update path.

Figure 3:
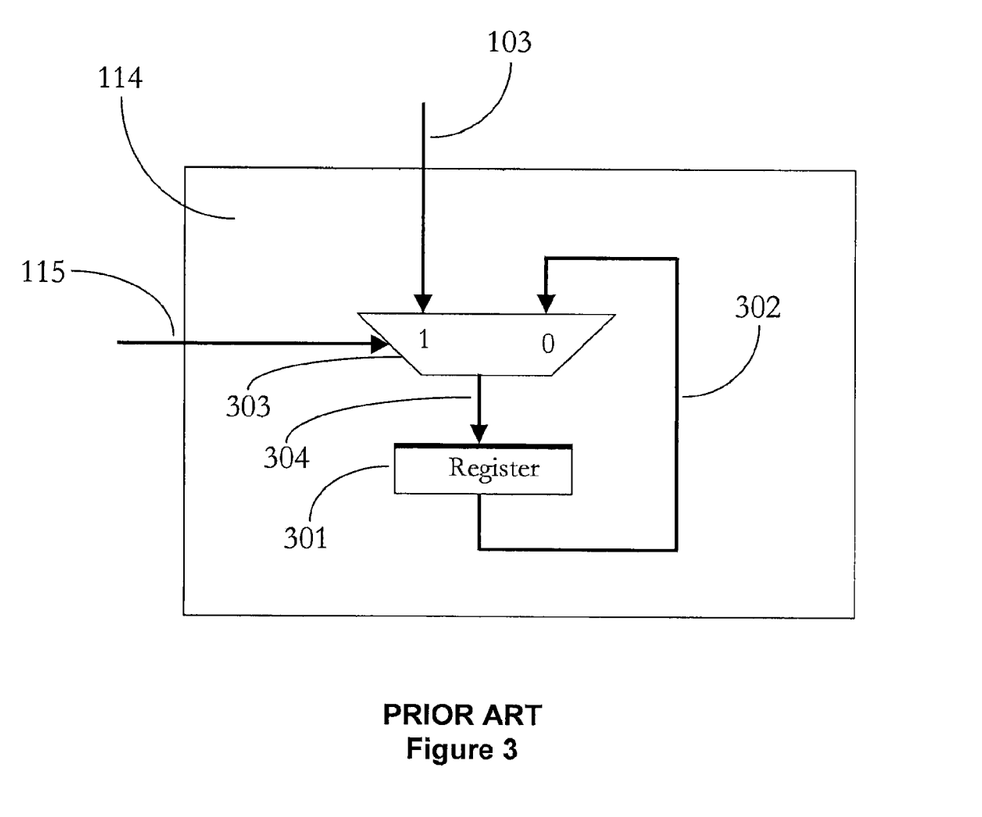
FIG. 3 illustrates a PRIOR ART example of detail on how the syndrome is captured in a trapping register.

Turning to the prior art depicted in FIG. 3, notice there is the syndrome trap register, 114, which is fed by the syndrome bus, 103, and trap update signal, 115. The syndrome trap register, 114, contains a register, 301. The current register state output bus, 302, of the register, 301, as well as the syndrome bus, 103, feed a multiplexer, 303. The multiplexer, 303, selects, based on the state of the trap update signal, 115, which of these two busses will be sent out on the multiplexer output bus, 304. The multiplexer output bus, 304, feeds the register, 301. This creates both a hold path and an update path to the register, 301. When the trap update signal, 115, is zero, the current register state output bus, 302, feeds back to the input of the register, 301, creating the hold path. When the trap update signal, 115, is one, the current state of the syndrome bus, 103, is fed into the register, 301, creating the update path.

Figure 4:
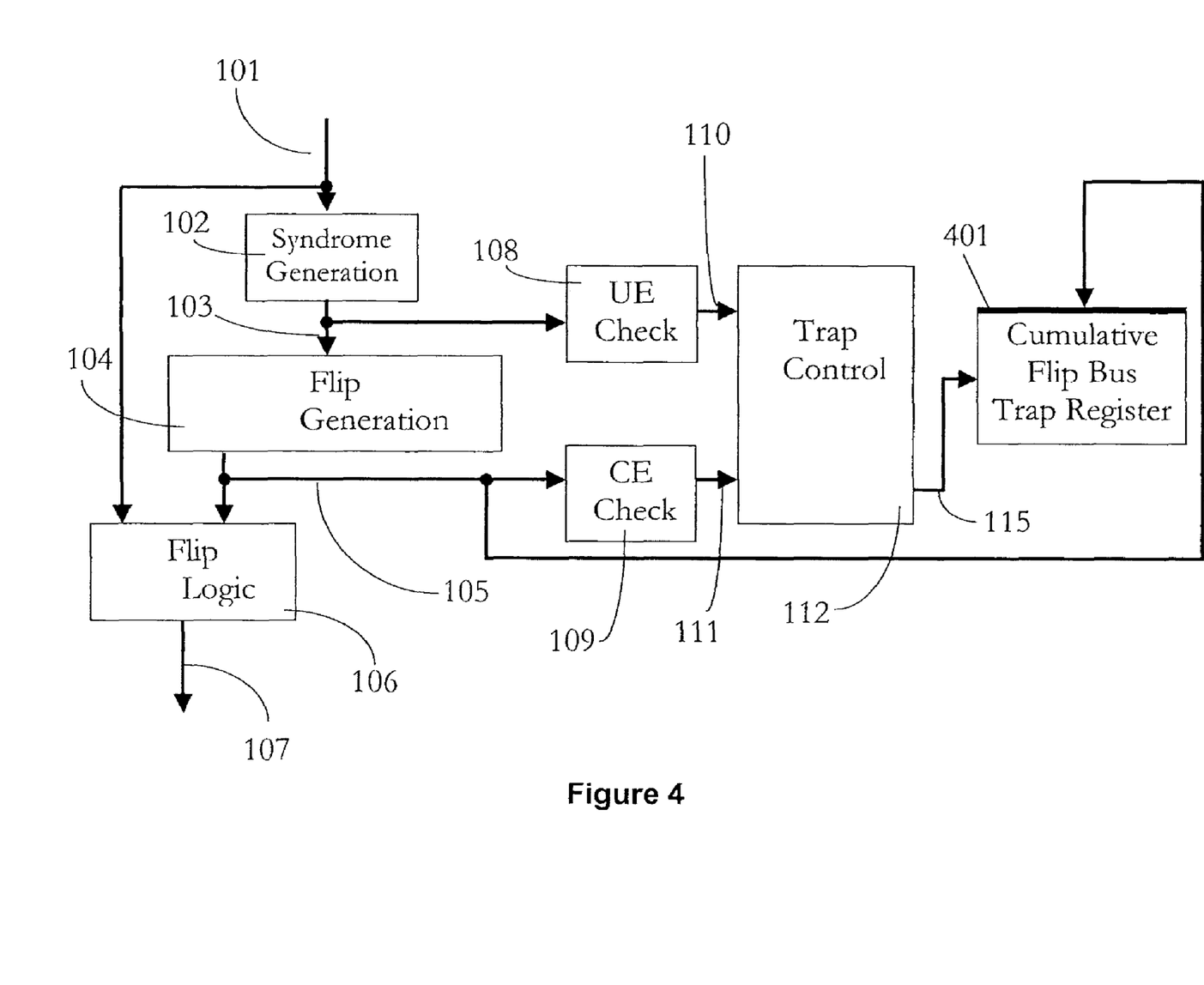
FIG. 4 illustrates a first embodiment example of ECC protected data in a system being corrected and a cumulative summary of all bit flips being captured in a trapping register.
Figure 5:
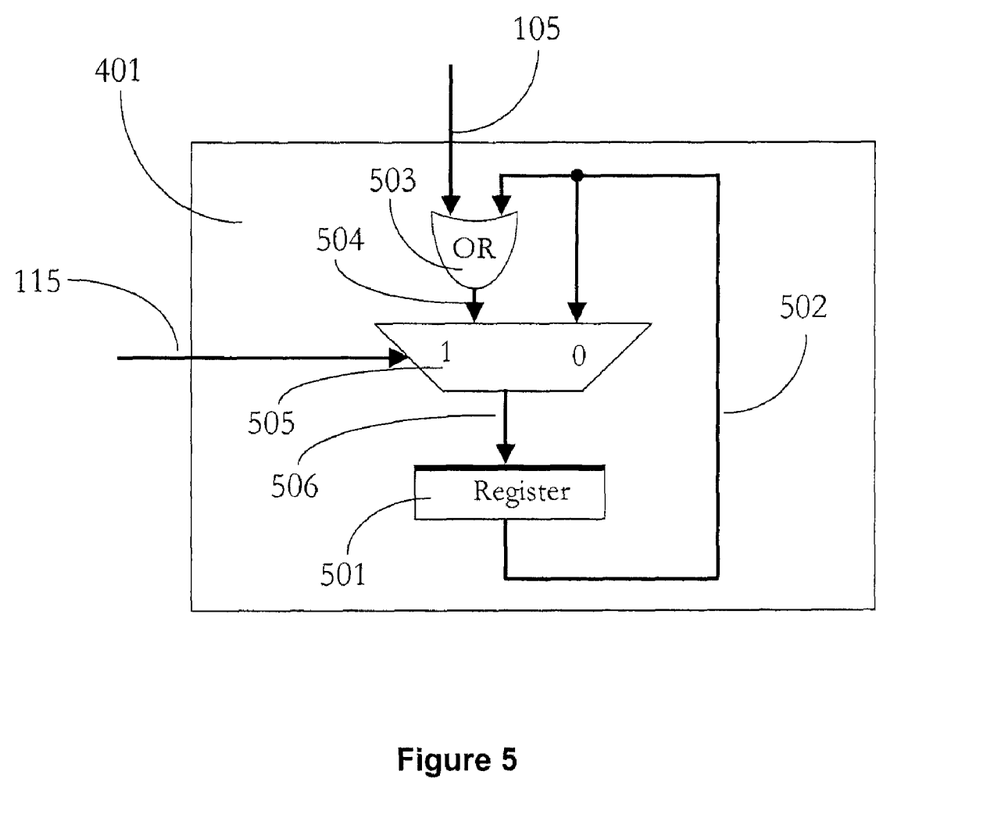
FIG. 5 illustrates a first embodiment example of detail on how the cumulative summary of all single bit flips are captured in a trapping register.

Turning to the first embodiment depicted in FIG. 4, notice there is an input data bus 101 with corresponding Error Correction Code (ECC) checkbits, as determined by an h-matrix. The input data bus, 101, then goes through syndrome generation logic, 102, which generates a syndrome, 103. The syndrome, 103, is connected to flip generation logic, 104, to provide flip bus 105. The flip bus 105 is XORed with the input data bus 101 using flip logic, 106, to create a corrected output data bus with ECC checkbits 107. The syndrome, 103, also feeds the UE check logic, 108, to determine if the input data bus, 101, had an Uncorrectable Error (UE). This UE status is indicated on ULE status signal, 110. All bits of the flip bus, 105, feed the CE check logic, 109, to determine if the input data bus, 101, had a Correctable Error (CE). This CE status is indicated on CE status signal, 111. The UE status signal, 110, and CE status signal, 111, feed trap control logic, 112, which determines whether to update trap information and indicates this update by activating trap update signal, 115. However, notice that cumulative flip bus trap register, 401, uses the flip bus, 105, to trap the cumulative status of all of the single flip bits that have occurred on the input data bus, 101 when the trap update signal, 115, is active. This allows every flip bit error to be trapped and to be accumulated into a history of corrected bits. Specifically, turning to the invention depicted in FIG. 5, notice there is the cumulative flip bus trap register, 401, which is fed by the flip bus, 105, and the trap update signal, 115. The cumulative flip bus trap register, 401, contains a register, 501. The current register state output bus 502, as well as the flip bus 105 feed an OR (logic gate) 503. The OR 503, creates a cumulative flip bus output, 504. The cumulative flip bus output 504, and the register state output bus 502, both feed a multiplexer, 505. The multiplexer 505 selects based on the state of the trap update signal, 115, which of these two buses will be sent out on the multiplexer output bus 506. The multiplexer output bus, 506 feeds the register 501. This creates both a hold path and an update path to the register 501. When the trap update signal, 115, is zero, the current register state output bus, 502, feeds back to the input of the register, 501, creating the hold path. When the trap update signal, 115, is one, the cumulative flip bus output, 504, feeds back to the input of the register, 501, creating the update path. This allows every flip bit error to be trapped in register 501 and to be accumulated into a history of corrected bits.

Figure 6:
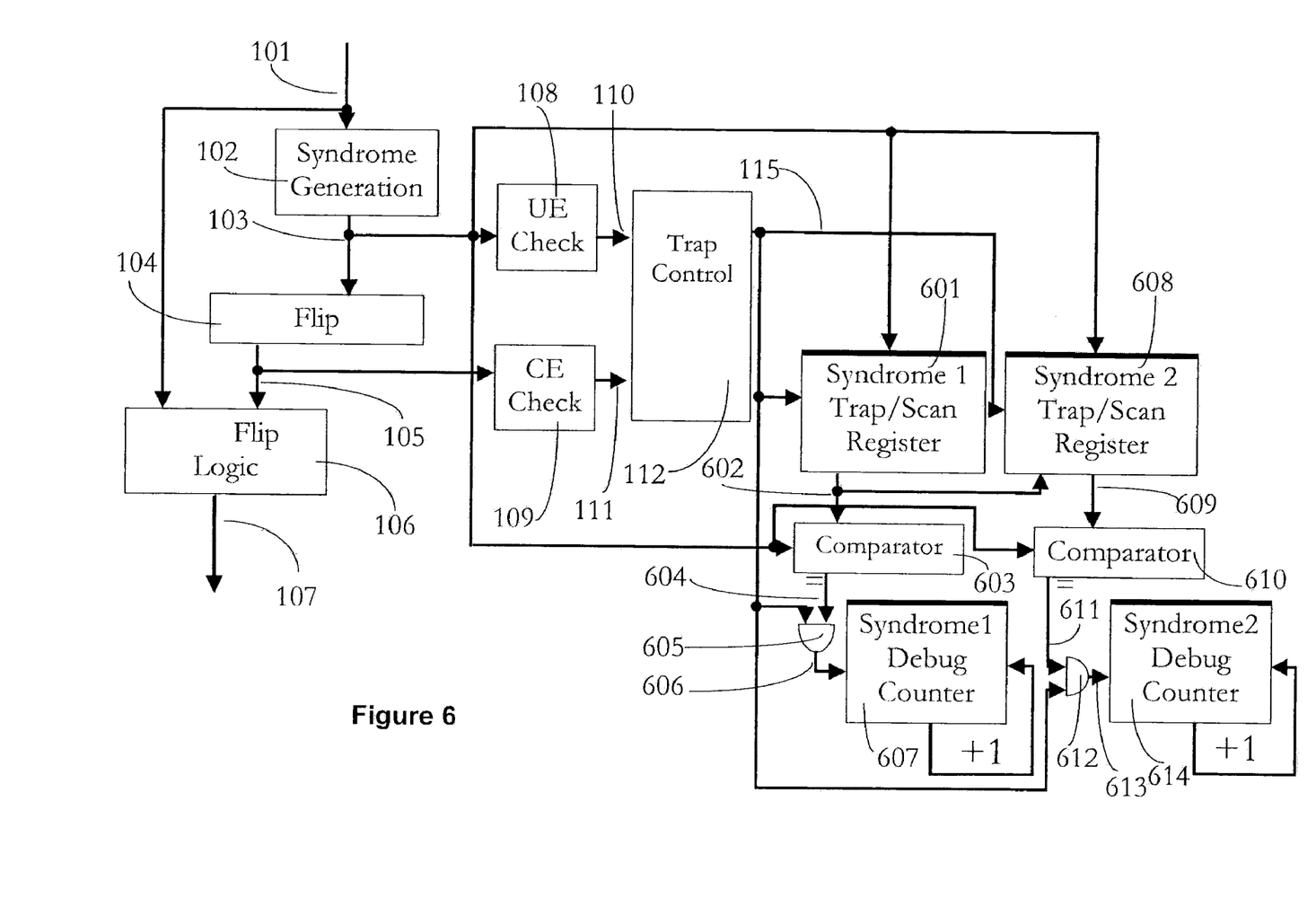
FIG. 6 illustrates a second embodiment example of ECC protected data in a system being corrected and the first two syndromes that occur in the system being captured in two individual trapping registers. It also shows a counter that is incremented whenever each of these syndromes occurs.

Turning to the second embodiment depicted in FIG. 6, notice there is an input data bus with corresponding Error Correction Code (ECC) checkbits, 101, as determined by an h-matrix. The input data bus, 101, then goes through syndrome generation logic, 102, which generates a syndrome, 103. The syndrome, 103, is connected to flip generation logic, 104, to provide flip bus 105. The flip bus, 105, is XORed with the input data bus, 101, using flip logic, 106, to create corrected output data bus with ECC checkbits, 107. The syndrome, 103, also feeds the UE check logic, 108, to determine if the input data bus, 101, had an Uncorrectable Error (UE).

This UE status is indicated on UE status signal, 110. All bits of the flip bus, 105, feed the CE check logic 109, to determine if the input data bus, 101, had a Correctable Error (CE). This CE status is indicated on CE status signal, 111. The UE status signal, 110, and CE status signal, 111, feed trap control logic, 112, which determines whether to update trap information and indicates this update by activating trap update signal 115. Syndrome one trap register, 601, traps the first syndrome to occur on the syndrome bus, 103, when the trap update signal, 115 is active. Syndrome two trap register, 608, traps the second syndrome to occur on the syndrome bus, 103, when the trap update signal, 115, is active. The contents of the syndrome one trap register, 601, are sent out on the syndrome one register state output bus 602. The syndrome one register state output bus, 602, and the syndrome, 103, both feed a comparator, 603. The results of the comparator, 603, are indicated on syndrome one compare signal, 604. The syndrome one compare signal, 604, and trap update signal, 115, both feed an AND 605. The result of the AND, 605, is indicated on the syndrome one count update signal, 606. The syndrome one count update signal, 606, indicates that an error was detected on the input data bus, 101, and its syndrome, 103, matches the syndrome trapped in the syndrome one trap register, 601. The syndrome one count update signal, 606, is used to increment the syndrome one hardware debug counter, 607. Likewise, the contents of the syndrome two trap register, 608, are sent out on the syndrome two register output bus, 609. The syndrome two register output bus, 609, and the syndrome, 103, both feed a comparator, 610. The results of the comparator, 610, are indicated on syndrome two compare signal, 611. The syndrome two compare signal, 611, and trap update signal, 115, both feed an AND, 612. The result of the AND, 612, is indicated on the syndrome two count update signal, 613. The syndrome two count update signal, 613, indicates that an error was detected on the input data bus, 101, and its syndrome, 103, matches the syndrome trapped in the syndrome two register output bus, 609. The syndrome two count update signal, 613, is used to increment the syndrome two hardware debug counter, 614.

Figure 7:
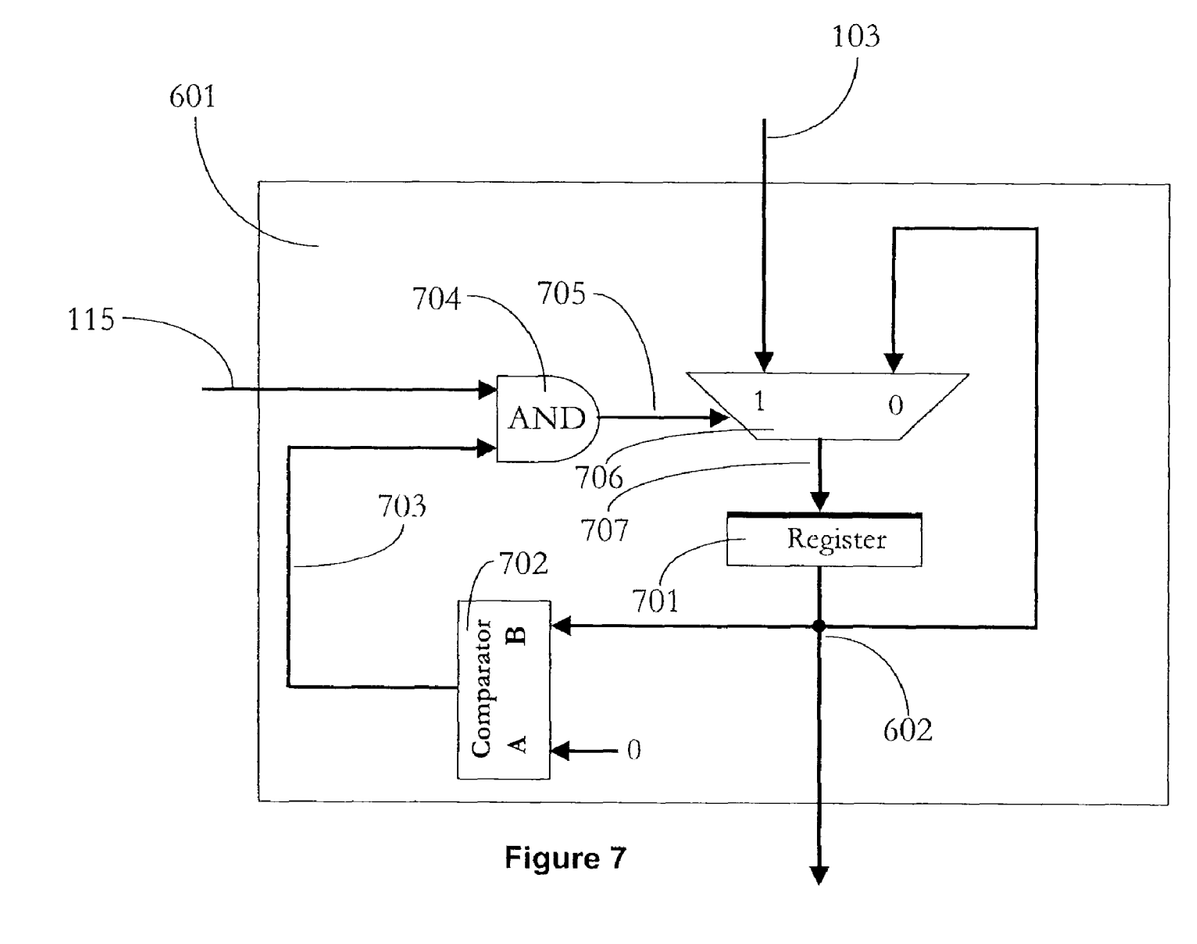
FIG. 7 illustrates a second embodiment example of detail on how the first syndrome is captured in a trapping register.

Turning to the second embodiment detail depicted in FIG. 7, notice there is the syndrome one trap register, 601, which is fed by the syndrome bus, 103, and trap update signal, 115. The syndrome one trap register, 601, contains a register, 701. The current register state is indicated on the syndrome one register state output bus, 602. The syndrome one register state output bus, 602, feeds a comparator, 702, which compares the current register state with zero to determine if the register is empty. The result of the compare is indicated on the register empty signal, 703. The trap update signal, 115, and the register empty signal, 703, both feed an AND, 704. The result of the AND indicates that the register is empty and an error was detected. This is indicated on a trap first syndrome signal, 705. The syndrome one register state output bus, 602, and the syndrome bus, 103, both feed a multiplexer, 706. The multiplexer, 706, selects which of these two buses will be sent out on the multiplexer output bus, 707, based on the trap first syndrome signal, 705. The multiplexer output bus, 707, feeds the register, 701. This creates both a hold path and an update path to the register 701. When the syndrome one trap signal, 705, is one, the register, 701, is currently empty. The register, 701, is then updated with the first occurring syndrome. When the trap first syndrome signal, 705, is zero, the current state of the register will be held. The first time the register gets updated, its contents will be non-zero and thus the comparator, 702, will never allow the update path to come on thus holding that trap of the first syndrome.

Figure 8:
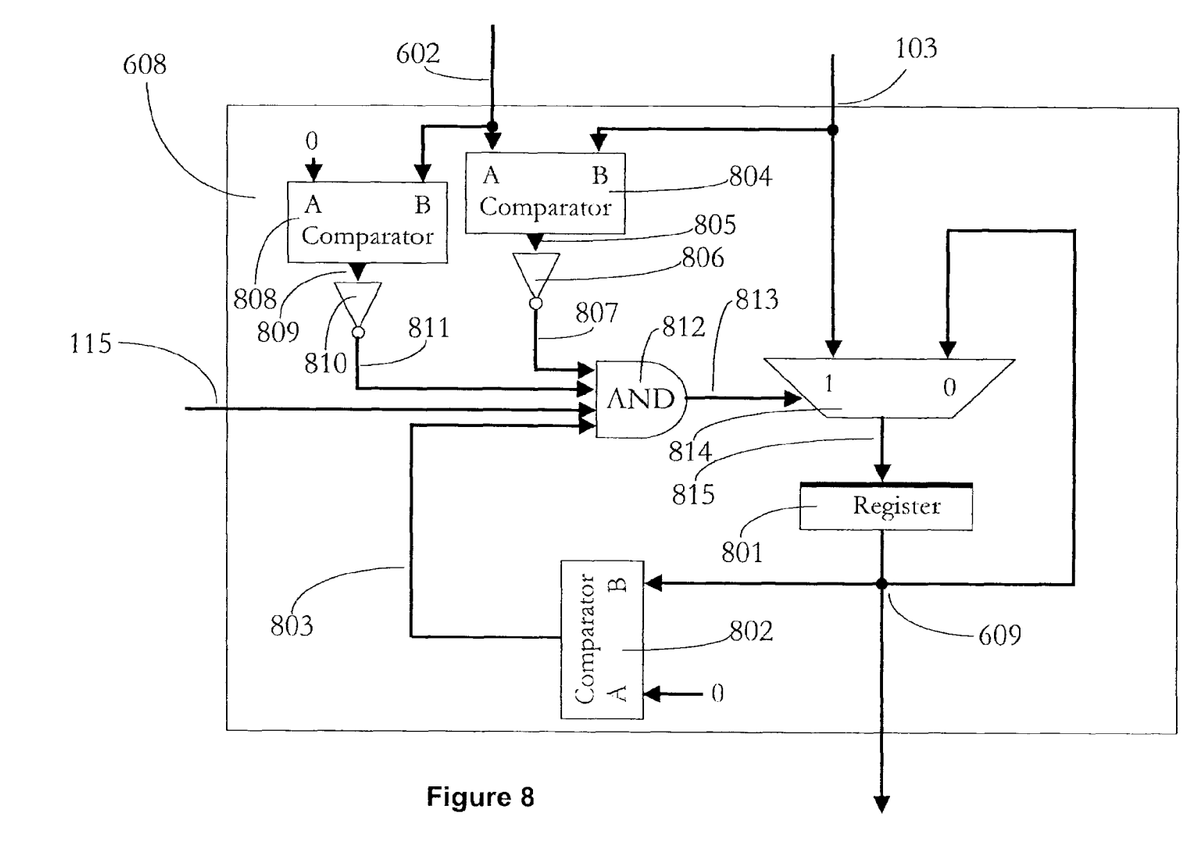
FIG. 8 illustrates a second embodiment example of detail on how the second syndrome is captured in a trapping register.

Turning to the further detail of the second embodiment depicted in FIG. 8, notice there is the syndrome two trap register, 608, which is fed by the syndrome bus, 103, and the trap update signal, 115. The syndrome two trap register, 608, contains a register, 801. The current register state is indicated on the syndrome two register state output bus, 609. The syndrome two register state output bus, 609, feeds a comparator, 802, which compares the current register state with zero to determine if the register is empty. The result of the compare is indicated on the register two empty signal, 803. The syndrome bus, 103, and the syndrome one register state output bus, 602, both feed a comparator, 804. The comparator, 804, reports if the syndrome one register state output bus, 602, and the syndrome are equal on syndrome is first syndrome signal, 805. The syndrome is first syndrome signal, 805, feeds an inverter, 806. The inverter, 806, results are indicated on the syndrome is not first syndrome signal, 807. The syndrome one register state output bus, 602, also feeds a comparator, 808, which compares the syndrome one register state output bus, 602, with zero. The result of the comparator, 808, is indicated on register one is zero signal, 809. The register one is zero signal, 809, feeds an inverter, 810, which indicates its status on register one is non zero signal, 811. The register one is non zero signal, 811, the syndrome is not first syndrome signal, 807, the register two empty signal, 803, and the trap update signal, 115, all feed an AND. The results of this AND, 812, are indicated on the trap register two signal, 813. The trap register two signal only turns on when the trap update signal, 115, is on; the syndrome one register, 601, is trapped with the first syndrome and is nonzero; and register two is empty. This makes it the second syndrome to occur that is trapped in the register, 801. The syndrome two register state output bus, 609, and the syndrome bus, 103, both feed a multiplexer, 814. The multiplexer, 814, selects which of these two buses will be sent out on the multiplexer output bus, 815, based on the trap second syndrome signal, 813. The multiplexer output bus, 815, feeds the register, 801. This creates both a hold path and an update path to the register 801. When the syndrome two trap signal, 813, is one, the register, 801, is currently empty and the syndrome one register output bus, 602, indicates that the first syndrome is trapped. The register, 801, is then updated with the second occurring syndrome. When the trap second syndrome signal, 813, is zero, the current state of the register will be held. The first time the register, 801, gets updated, its contents will be non-zero and thus the comparator, 802, will never allow the update path to come on thus holding the trap of the second syndrome.

Figure 9:
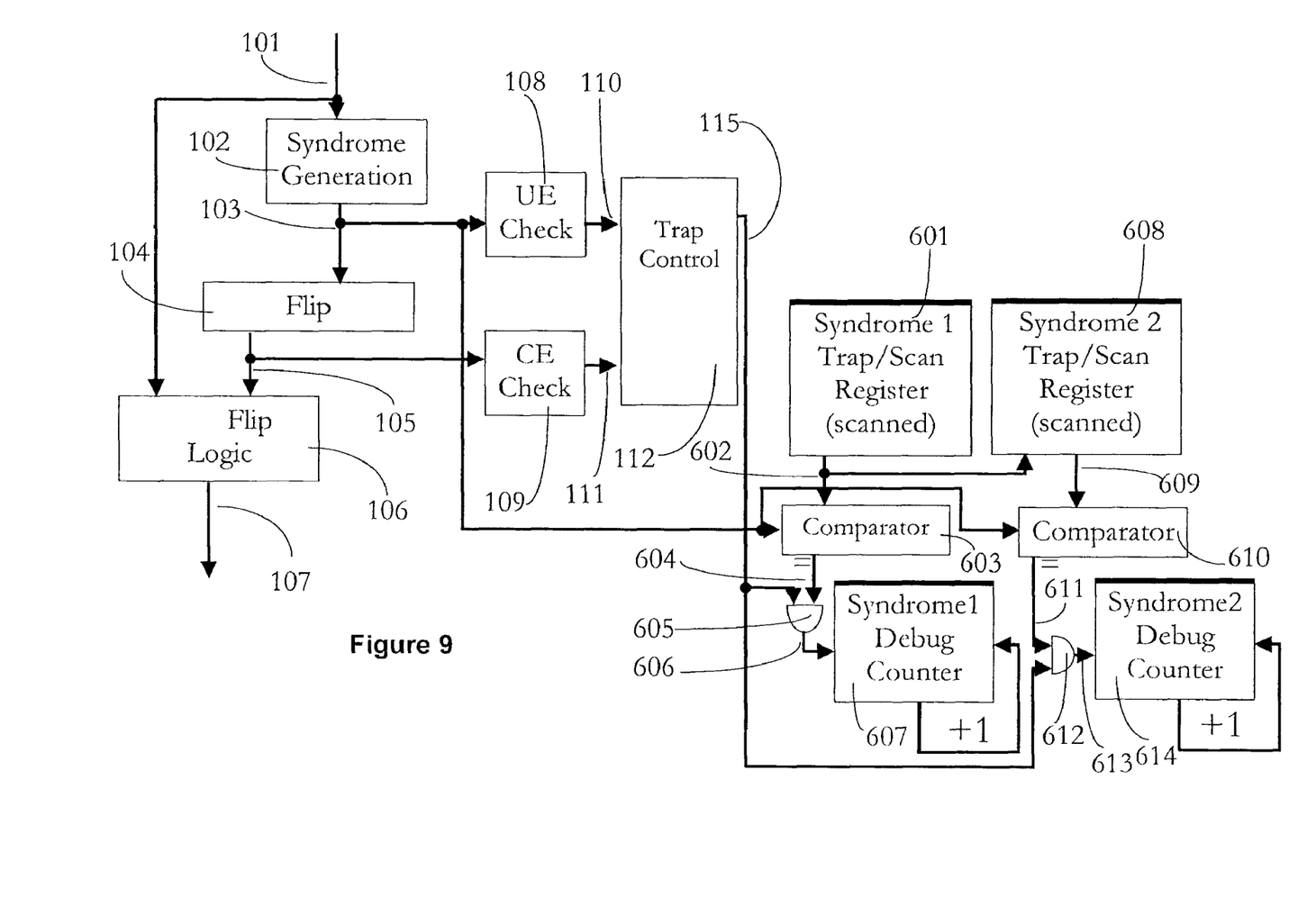
FIG. 9 illustrates a third embodiment example of ECC protected data in a system being corrected. It also shows two syndromes that are scanned into the system. It also shows that whenever either of these syndromes occurs in the system, the corresponding counter is incremented.

Turning to the third embodiment depicted in FIG. 9, notice there is an input data bus with corresponding Error Correction Code (ECC) checkbits, 101, as determined by an h-matrix. The input data bus, 101, then goes through syndrome generation logic, 102, which generates a syndrome, 103. The syndrome, 103, is connected to flip generation logic, 104, to provide flip bus, 105. The flip bus, 105, is XORed with the input data bus, 101, using flip logic, 106, to create corrected output data bus with ECC checkbits, 107. The syndrome, 103, also feeds the UE check logic, 108, to determine if the input data bus, 101, had an Uncorrectable Error (UE). This UE status is indicated on UE status signal, 110. All bits of the flip bus, 105, feed the CE check logic, 109, to determine if the input data bus, 101, had a Correctable Error (CE). This CE status is indicated on CE status signal, 111. The UE status signal, 110, and CE status signal, 111, feed trap control logic, 112, which determines whether to update trap information and indicates this update by activating trap update signal, 115. A syndrome is scanned into the syndrome one register, 601, activating the hold path in the register. Likewise, another syndrome is scanned into the syndrome two register, 608. The contents of the syndrome one trap register, 601, are sent out on the syndrome one bus, 602. The syndrome one register output bus, 602, and the syndrome, 103, both feed a comparator, 603. The results of the comparator, 603, are indicated on syndrome one compare signal, 604. The syndrome one compare signal, 604, and the trap update signal, 115, both feed an AND, 605. The result of the AND, 605, is indicated on the syndrome one count update signal, 606. The syndrome one count update signal indicates that an error was detected on the input data bus, 101, and its syndrome, 103, matches the syndrome trapped in the syndrome one trap register, 601. The syndrome one count update signal, 606, is used to increment the syndrome one hardware debug counter 607. Likewise, the contents of the syndrome two trap register, 608, are sent out on the syndrome two register output bus, 609. The syndrome two register output bus, 609, and the syndrome, 103, both feed a comparator, 610. The results of the comparator, 610, are indicated on syndrome two compare signal, 611. The syndrome two compare signal, 611, and trap update signal, 115 both feed an AND 612. The result of the AND, 612, is indicated on the syndrome two count update signal, 613. The syndrome two count update signal, 613, indicates that an error was detected on the input data bus, 101, and its syndrome, 103, matches the syndrome trapped in the syndrome two trap register bus, 608. The syndrome two count update signal, 613, is used to increment the syndrome two hardware debug counter, 614. This allows the user of the hardware to count two syndromes defined by the user.

Figure 10:
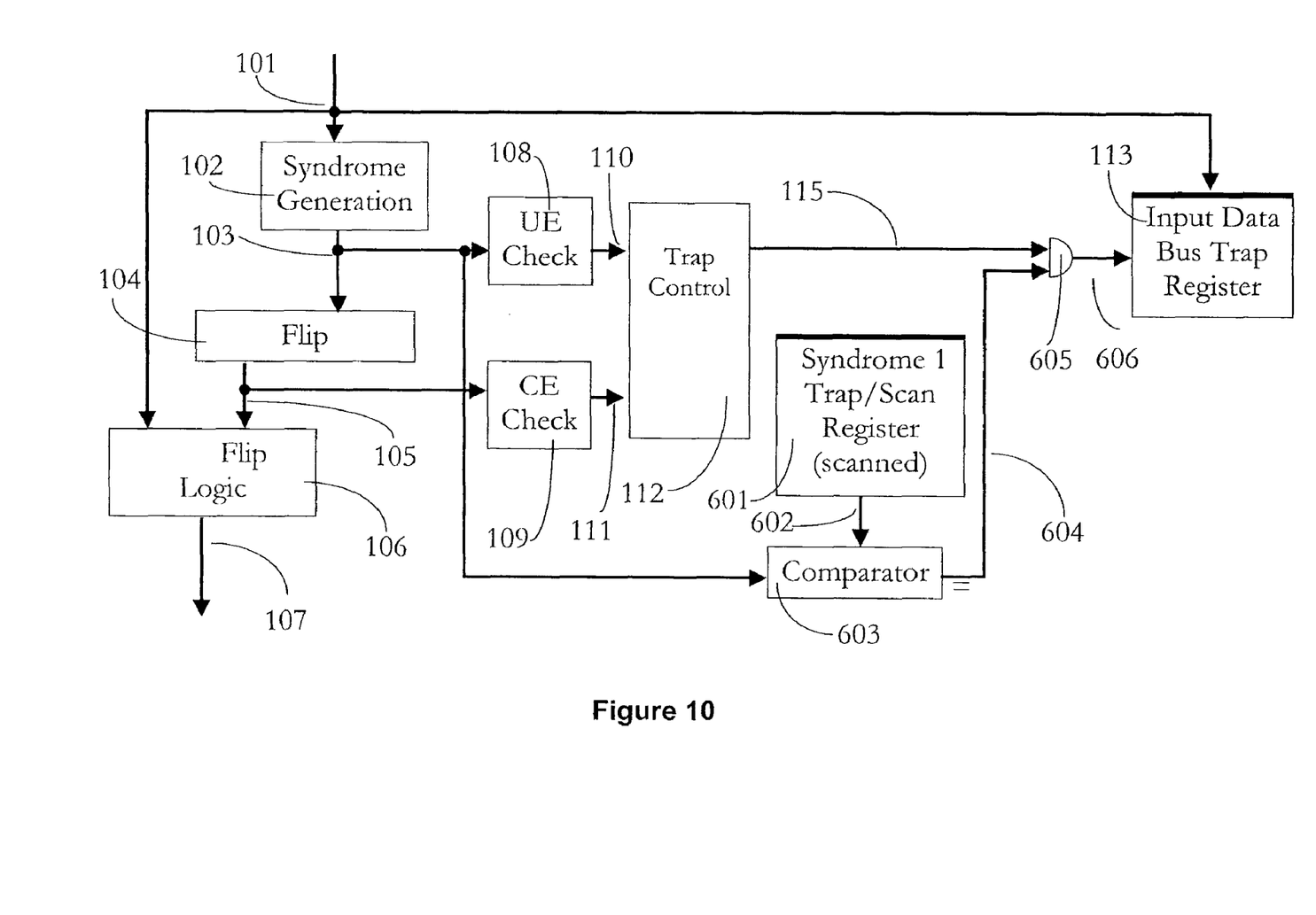
FIG. 10 illustrates a fourth embodiment example of ECC protected data in a system being corrected and the data pattern, ECC pattern and syndrome being captured only when a specific syndrome is encountered.

Turning to the fourth embodiment depicted in FIG. 10, notice an input data bus with corresponding Error Correction Code (ECC) checkbits, 101, as determined by an h-matrix. The input data bus, 101, then goes through syndrome generation logic, 102, which generates a syndrome, 103. The syndrome, 103, is connected to flip generation logic, 104, to provide flip bus, 105. The flip bus, 105, is XORed with the input data bus, 101, using flip logic, 106, to create corrected output data bus with ECC checkbits, 107. The syndrome, 103, also feeds UE check logic, 108, to determine if the input data bus, 101, had an Uncorrectable Error (UE). This UE status is indicated on UE status signal, 110. All bits of the flip bus, 105, feed CE detection logic, 109, to determine if the input data bus, 101, had a Correctable Error (CE). This CE status is indicated on CE status signal, 111. The UE status signal, 110, and CE status signal, 111, feed trap control logic, 112, which determines whether to update trap information and indicates this update by activating trap update signal, 115. A syndrome is scanned into the syndrome one register, 601, activating the hold path in the register. The contents of the syndrome one trap register, 601, are sent out on the syndrome one register output bus, 602. The syndrome register output bus, 602, and the syndrome, 103, both feed a comparator, 603. The results of the comparator, 603, are indicated on syndrome one compare signal, 604. The syndrome one compare signal, 604, and the trap update signal, 115, both feed an AND, 605. The result of the AND, 605, is indicated on the syndrome one count update signal, 606. The syndrome one count update signal indicates that an error was detected on the input data bus, 101, and its syndrome, 103, matches the syndrome scanned into the syndrome one trap register, 601. The syndrome one count update signal, 606, is used to update the input data bus trap register, 113. This allows the input data bus, 101, to be trapped when a predetermined syndrome is detected on the syndrome bus, 103.

Figure 11:
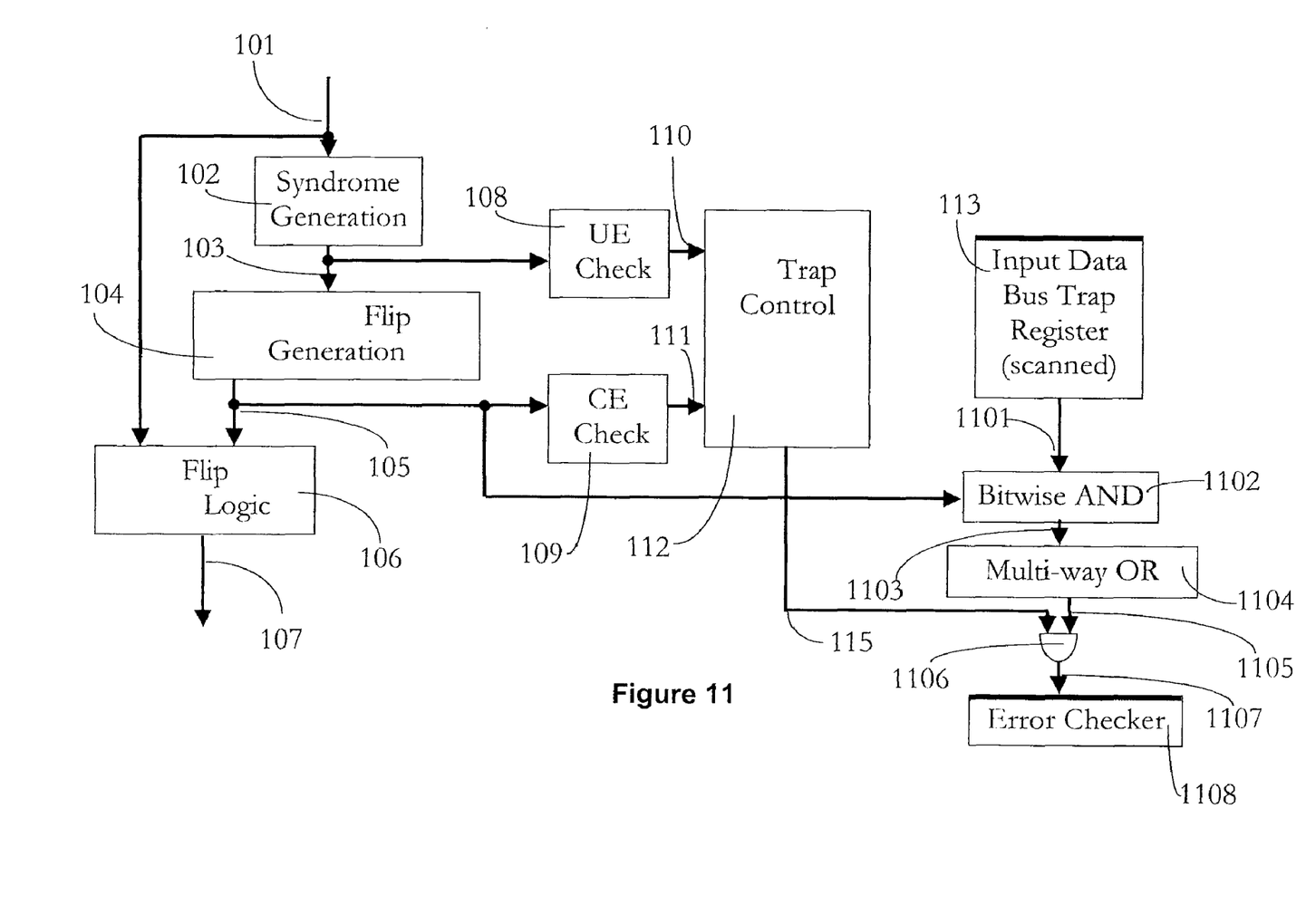
FIG. 11 illustrates a fifth embodiment example of ECC protected data in a system being corrected. It also shows a register that has a mask of flip bits scanned into it. It shows that whenever one of the flip bits in the mask turns on an error checker is turned on in the system.

Turning to the fifth embodiment of the invention depicted in FIG. 11, notice an input data bus with corresponding Error Correction Code (ECC) checkbits, 101, as determined by an h-matrix. The input data bus, 101, then goes through syndrome generation logic, 102, which generates a syndrome, 103. The syndrome, 103, is connected to flip generation logic, 104, to provide flip bus, 105. The flip bus, 105, is XORed with the input data bus, 101, using flip logic, 106, to create corrected output data bus with ECC checkbits, 107. The syndrome, 103, also feeds UE check logic, 108, to determine if the input data bus, 101, had an Uncorrectable Error (UE). This UE status is indicated on ULE status signal, 110. All bits of the flip bus, 105, feed CE detection logic, 109, to determine if the input data bus, 101, had a Correctable Error (CE). This CE status is indicated on CE status signal, 111. The UE status signal, 110, and CE status signal, 111, feed trap control logic, 112, which determines whether to update trap information and indicates this update by activating trap update signal, 115. A mask is scanned into the input data register, 113, indicating a set of flip bits, such that when one of those flip bits occurs on the flip bus, 105, it will trigger an error checker, 1108. The mask is sent out on input data bus trap register content signal, 1101. The input data bus trap register content signal, 1101, and the flip bus, 105, both feed a bitwise AND, 1102. Which ANDs each bit in the mask fed by the input data bus trap register content, 113, with its corresponding bit on the flip bus, 105. Any resulting ones indicate that a bit is on in both buses. The result of the bitwise AND is sent out on the bitwise AND result bus, 1103 which in turn feeds a multi-way OR, 1104. The multi-way OR, 1104, ORs all of the bits in the bitwise AND result bus, 1103. The result of the OR, 1104, is reported on a flip mask status signal, 1105. The flip mask status signal, 1105, and the trap update signal, 115, both feed an AND, 1106, which indicates if both of these signals are on with a set error checker signal, 1107. The set error checker signal, 1107, indicates that at least one of the flip bus bits, 103, matched a bit in the mask, thus allowing programmability to stop on particular correctable errors. The set error checker signal, 1107, feeds an error checker, 1108, which can be used to stop the system for debug.

Figure 12:
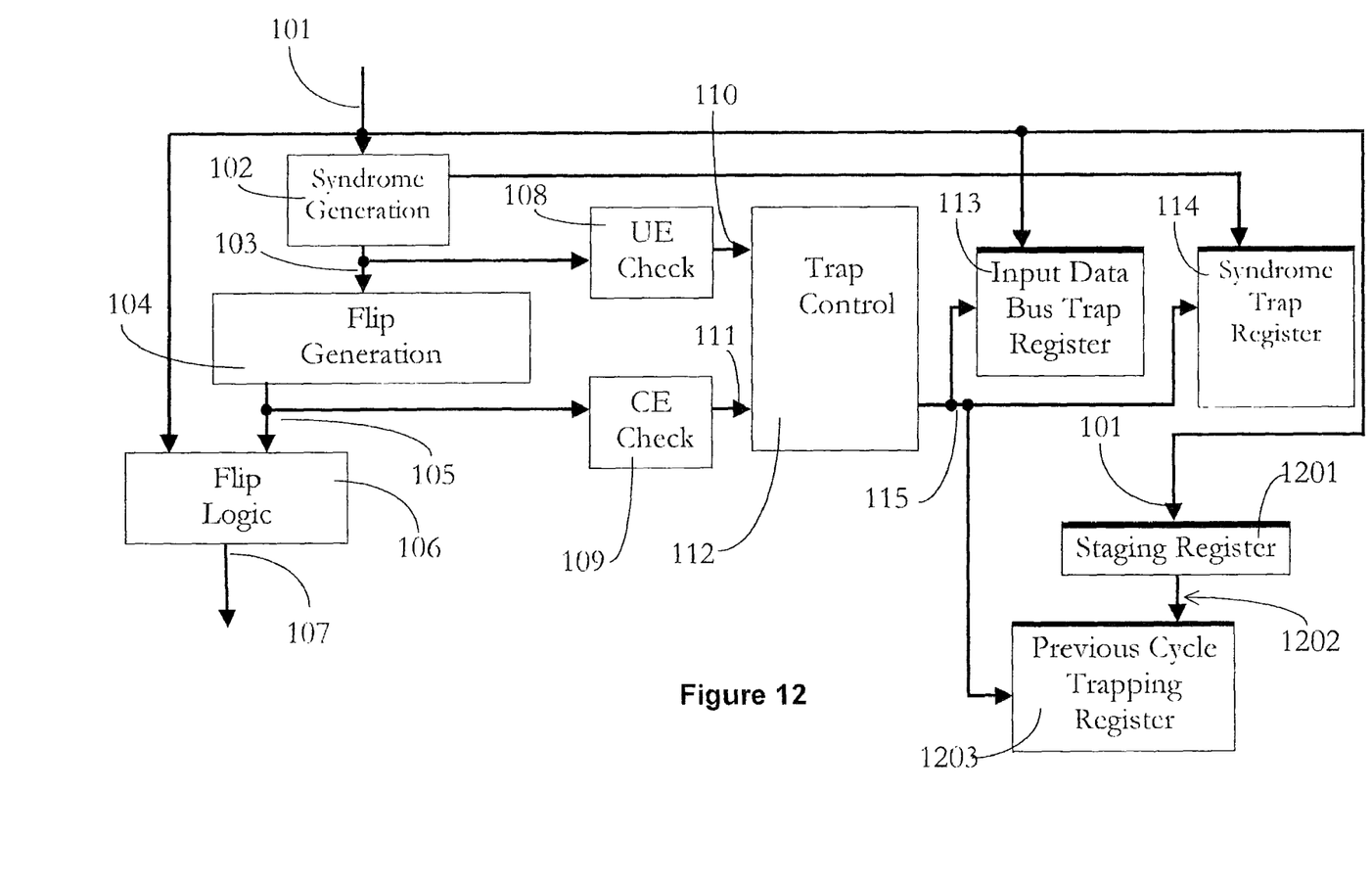
FIG. 12 illustrates a sixth embodiment example of ECC protected data in a system being corrected. It also shows the input data pattern being trapped for the cycle of the fail as well as the input data bus state the cycle before the fail.

Turning to the sixth embodiment depicted in FIG. 12, notice there is an input data bus with corresponding Error Correction Code (ECC) checkbits, 101, as determined by an h-matrix. The input data bus, 101, then goes through syndrome generation logic, 102, which generates a syndrome, 103. The syndrome, 103, is connected to flip generation logic, 104, to provide flip bus, 105. The flip bus, 105, is XORed with the input data bus, 101, using flip logic, 106, to create corrected output data bus with ECC checkbits 107. The syndrome, 103, also feeds UE check logic, 108, to determine if the input data bus, 101, had an Uncorrectable Error (UE). This UE status is indicated on UE status signal, 110. All bits of the flip bus, 105, feed CE detection logic, 109, to determine if the input data bus, 101, had a Correctable Error (CE). This CE status is indicated on CE status signal, 111. The UE status signal, 110, and CE status signal, 111, feed trap control logic, 112, which determines whether to update trap information and indicates this update by activating trap update signal, 115. Input data trap register, 113, traps the value of the input data bus with ECC, 101, when the trap update signal, 115, is active. The input data bus, 101, also feeds a staging register, 1201. The staging register holds the state of the input data bus, 101, one clock cycle prior to the current cycle being checked. The contents of the staging register, 1201, are provided on an input data previous state bus, 1202. Previous cycle trapping register, 1203, traps the value of the input data previous state bus, 1202, when the trap update signal, 115, is active. This allows one to see the transition of the bus when the error occurred, by observing the contents of the previous cycle trapping register, 1203, and the input data trap register, 113.

Figure 13:
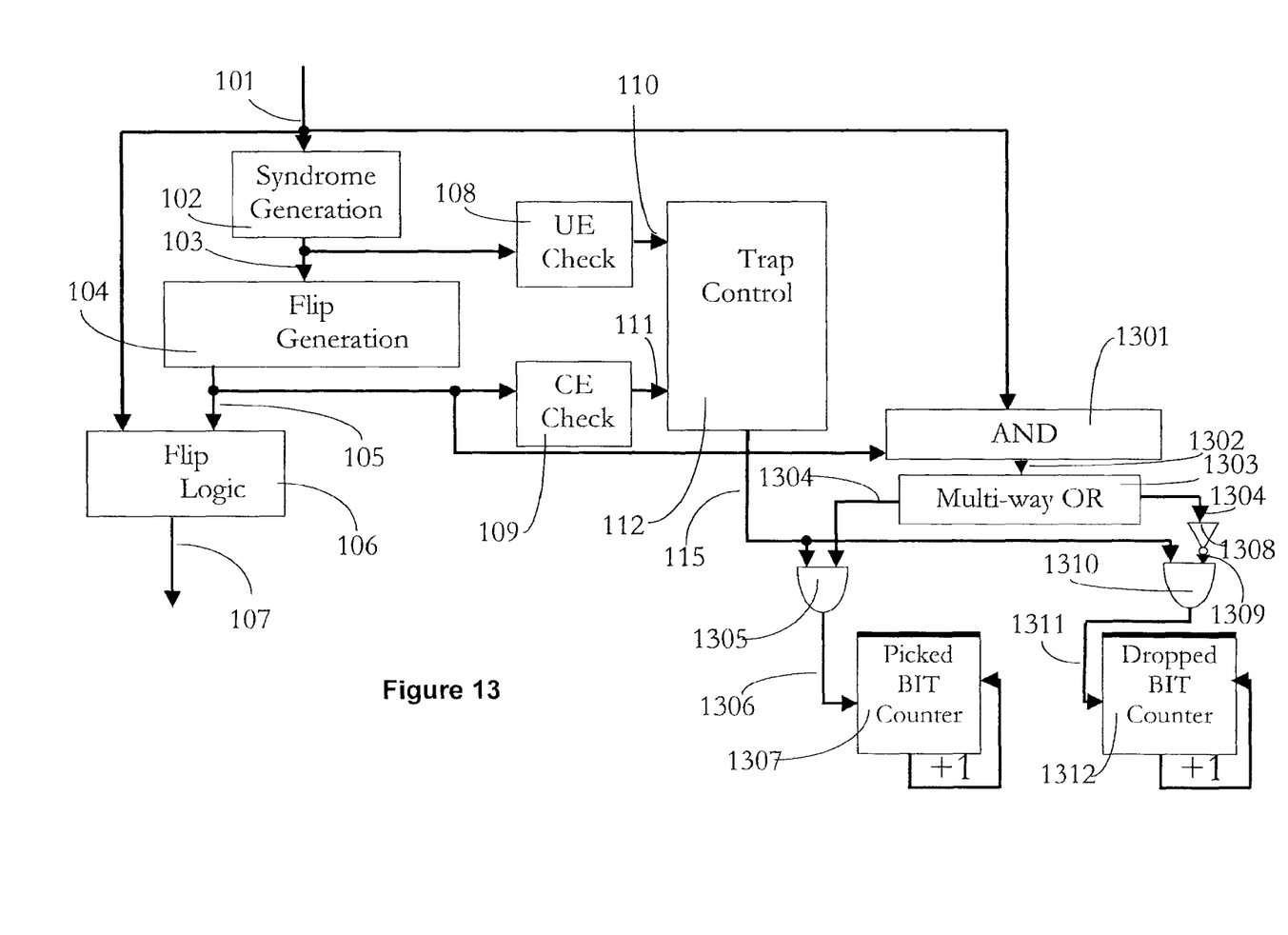
FIG. 13 illustrates a seventh embodiment example of ECC protected data in a system being corrected. It also shows the system determining whether the failing bit was picked or dropped and updating a counter picked bits or dropped bits.

Turning to the seventh embodiment depicted in FIG. 13, notice an input data bus with corresponding Error Correction Code (ECC) checkbits, 101, as determined by an h-matrix. The input data bus, 101, then goes through syndrome generation logic, 102, which generates a syndrome, 103. The syndrome, 103, is connected to flip generation logic, 104, to provide flip bus, 105. The flip bus, 105, is XORed with the input data bus, 101, using flip logic, 106, to create corrected output data bus with ECC checkbits, 107. The syndrome, 103, also feeds UE check logic, 108, to determine if the input data bus, 101, had an Uncorrectable Error (UE). This UE status is indicated on UE status signal, 110. All bits of the flip bus, 105, feed CE detection logic, 109, to determine if the input data bus, 101, had a Correctable Error (CE). This CE status is indicated on CE status signal, 111. The UE status signal, 110, and CE status signal, 111, feed trap control logic, 112, which determines whether to update trap information and indicates this update by activating trap update signal, 115. The input data bus, 101, and the flip bus 105, both feed a bitwise AND, 1301, which ANDs each bit in the flip bus, 105, with each corresponding bit in the input data bus, 101. A flip bit ANDed with a zero will return a zero and indicates a dropped bit, while a flip bit ANDed with a one will return a one and indicates a picked bit. The results of the AND, 1301, are indicated on a picked/dropped bit status bus, 1302. The picked/dropped bit status bus, 1302, feeds a multi-way OR, 1303, which ORs all of the bits in the picked/dropped bit status bus, 1302 together. The result of the OR is indicated on the picked bit update signal, 1304, which is a one if a picked bit is detected or a zero if a dropped bit is detected. The picked bit update signal, 1304, and the trap update signal, 115, both feed an AND, 1305. The result of the AND is indicated on a picked bit counter update signal, 1306. The picked bit counter update signal, 1306, is used to increment a picked bit hardware debug counter, 1307, which keeps count of the number of the number of single bit fails in the system that were picked bits. The picked bit update signal, 1304, also feeds an inverter, 1308, which indicates its results on a dropped bit update signal, 1309. The dropped bit update signal, 1309, and the trap update signal, 115, both feed an AND, 1310. The result of the AND is indicated on a dropped bit counter update signal, 1311. The dropped bit counter update signal, 1311, is used to increment a dropped bit hardware debug counter, 1312, which keeps count of the number of single bit fails in the system that were dropped bits.

The capabilities of the present invention can be implemented in software, firmware, hardware or some combination thereof. Some of these options can be used in conjunction with one another as each affects a certain subset of trap registers in the logic. In other words, some of the device and logic can be shared to minimize any circuits or methods dedicated to debugging functions.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method of error correction code (ECC) debugging for a system comprising:
   receiving data having an ECC;
   determining whether a data error has occurred;
   generating a first syndrome of an error result;
   decoding flipped data bits;
   determining whether the data error is correctable;
   processing the received data and the decoded flipped bits to correct the data based on determining that the data error is correctable;
   outputting corrected data having an ECC;
   generating a trap update signal based on determining that the data error is uncorrectable;
   saving the first syndrome in a first register;
   saving a second syndrome in a second register;
   inputting contents of the first register and the first syndrome into a first comparator;
   inputting contents of the second register and the first syndrome into a second comparator;
   determining whether the trap update signal matches an output of the first comparator;
   incrementing a first debug counter based on determining that the trap update signal matches the output of the first comparator;
   determining whether the trap update signal matches an output of the second comparator;
   incrementing a second debug counter based on determining that the trap update signal matches the output of the second comparator;
   receiving the trap update signal; and
   saving the received data having an ECC based on receiving the trap update signal.

2. The method of claim 1, wherein the method further comprises generating the trap update signal based on determining that the data error includes correctable data.

3. The method of claim 1, wherein the method further comprises generating the trap update signal based on determining that the data error includes both correctable and uncorrectable data.

4. A system for error correction code (ECC) debugging, the system comprising a processor operative to:
   receive data having an ECC;
   determine whether a data error has occurred;
   generate a first syndrome of an error result;
   decode flipped data bits;
   determine whether the data error is correctable;

processing the received data and the decoded flipped bits to correct the data based on determining that the data error is correctable;
output corrected data having an ECC;
generate a trap update signal based on determining that the data error is uncorrectable;
save the first syndrome in a first register;
save a second syndrome in a second register;
input contents of the first register and the first syndrome into a first comparator;
input contents of the second register and the first syndrome into a second comparator;
determine whether the trap update signal matches an output of the first comparator;
increment a first debug counter based on determining that the trap update signal matches the output of the first comparator;
determine whether the trap update signal matches an output of the second comparator;
increment a second debug counter based on determining that the trap update signal matches the output of the second comparator;
receive the trap update signal; and
save the received data having an ECC based on receiving the trap update signal.

5. The system of claim 4, wherein the processor is further operative to generate the trap update signal based on determining that the data error includes correctable data.

6. The system of claim 4, wherein the processor is further operative to generate the trap update signal based on determining that the data error includes both correctable and uncorrectable data.

* * * * *